United States Patent
Ondet et al.

(10) Patent No.: US 7,620,814 B2
(45) Date of Patent: Nov. 17, 2009

(54) SYSTEM AND METHOD FOR DISTRIBUTING DATA

(75) Inventors: Olivier Ondet, Paris (FR); Henri Gilbert, Bures sur Yvette (FR); Pascal Chauvaud, Issy les Moulineaux (FR); Michel Milhau, Cairon (FR)

(73) Assignee: France Telecom, Paris (FR)

( * ) Notice: Subject to any disclaimer, the term of this patent is extended or adjusted under 35 U.S.C. 154(b) by 934 days.

(21) Appl. No.: 10/926,913

(22) Filed: Aug. 26, 2004

(65) Prior Publication Data

US 2005/0097327 A1    May 5, 2005

(30) Foreign Application Priority Data

Sep. 3, 2003   (EP) ................... 03292173

(51) Int. Cl.
     *H04L 9/32*    (2006.01)
     *H04N 7/167*    (2006.01)
     *G06Q 40/00*    (2006.01)

(52) U.S. Cl. .................. 713/172; 380/227; 380/228; 380/229; 380/230; 380/231; 380/232; 705/41

(58) Field of Classification Search ............. 713/172; 380/227–232; 705/41
See application file for complete search history.

(56) References Cited

U.S. PATENT DOCUMENTS

| | | | |
|---|---|---|---|
| 6,466,671 B1 * | 10/2002 | Maillard et al. | ............ 380/227 |
| 6,925,560 B1 | 8/2005 | Basquin | |
| 2002/0080969 A1 | 6/2002 | Giobbi | |
| 2003/0079133 A1 | 4/2003 | Ederer et al. | |
| 2004/0024846 A1 * | 2/2004 | Randall et al. | ............ 709/219 |
| 2005/0105731 A1 * | 5/2005 | Basquin | ............ 380/247 |

FOREIGN PATENT DOCUMENTS

| | | |
|---|---|---|
| EP | 1 335 266 | 8/2003 |
| EP | 1 335 266 A | 8/2003 |
| WO | WO 00/75883 | 12/2000 |
| WO | WO 00/75883 A | 12/2000 |

* cited by examiner

*Primary Examiner*—Shin-Hon Chen
(74) *Attorney, Agent, or Firm*—Cohen Pontani Lieberman & Pavane LLP

(57) ABSTRACT

A system that distributes content access data which provides rights management data indicating a right of a user to reproduce and/or copy the distributed content. The system includes an applications device including a trusted player for receiving, reproducing and/or copying the content, and a smart card access device for accessing a smart card, such as a Subscriber Identity Module (SIM), which is uniquely associated with the user. A trusted server communicates the content access data to the smart card via a communications network by encrypting the content access data using an encryption key pre-stored on the smart card and known to the trusted server. A facility is thus provided for cost effectively distributing content and managing rights in the content using security facilities inherent in the smart card.

26 Claims, 9 Drawing Sheets

SYSTEM AND METHOD FOR DISTRIBUTING DATA

FIELD OF THE INVENTION

The present invention also relates to systems and methods for distributing content access data to users, the content access data providing rights management data indicating a right of the user to reproduce and/or copy distributed content.

In some embodiments the content access data is distributed via a communications network. The communications network may include a mobile communications network.

BACKGROUND OF THE INVENTION

With the increasing bandwidth provided by an enhancement to mobile communications infrastructure, as networks migrate from 2G to 3G networks, there is a requirement for a facility for distributing digital content to mobile users, in a way which supports the rights of the content provider. One example of content may be a video clip or film, which a user may wish to download for viewing or copying. Other examples include multimedia content, which may combine audio, video and interactive data.

An increasing concern of content providers is that revenue is being lost through illegal pirate copying which is facilitated by the digital format of content and the availability of equipment such as personal computers which can be used to easily generate high quality copies of content. Therefore, although there is an increasing requirement to distribute content productions to users, there is also concern that the distribution of this content should not give rise to a proliferation in copying and unauthorised reproducing. The management and control of the rights in content is therefore required, which is referred to generally as digital rights management. The distribution of content is usually associated with a licence, which determines the conditions under which reproduction of that content may be made and/or conditions under which the content may be copied. For example, the content may be reproduced only once or may be reproduced many times and copied only once. Alternatively, content may be reproduced any number of times and may be copied freely.

The combination of an increased demand for content which should be delivered to mobile users in combination with a requirement to manage the rights in that content requires a facility for securely distributing the content and managing the rights in the content once delivered.

SUMMARY OF THE INVENTION

According to the present invention there is provided a system for distributing content access data to a user. The content access data provides rights management data indicating a right of the user to reproduce and/or copy distributed content. The system comprises an applications device including an application program forming a trusted player for receiving and reproducing and/or copying the content, and a smart card access device operable to access a smart card which is uniquely associated with the user. The smart card may be, for example, a Subscriber Identity Module (SIM). The system includes a trusted server operable to communicate securely the content access data to the smart card via a communications network by encrypting the content access data using a first encryption key (KC) pre-stored on the smart card and known to the trusted server. The smart card is operable to decrypt the content access data using the first encryption key (KC) and to store the content access data on the smart card. The trusted player is operable to access the rights management data provided with the content access data on the smart card, and to reproduce and/or copy the content in accordance with the rights management data.

In one embodiment the content received by the applications device has been encrypted using a content encryption key, the content access data includes the content key for decrypting the content. The system thereby provides a facility for distributing content and for managing the rights in the content in a cost efficient way using security facilities inherent in the smart card. The cost efficiency results partly from using private key encryption using the smart card.

The content access data may include conditions for the use of the content data. The content access data may therefore provide digital rights management data indicating, for example, the conditions for reproducing the content data and/ or an indication as to whether the content may be copied and if so a number of times the content data may be copied.

Embodiments of the present invention utilise inherent facilities of smart cards which are uniquely associated with a particular user. Smart cards such as the SIM or USIM include a pre-stored key for effecting secure communications with an entity via a communications network. A smart card therefore includes some hardware arrangement, which restricts access to parts of the memory formed in the smart card. Therefore, the key stored within the smart card cannot be accessed unless certain conditions are met. As a result, the key provides a secure facility for communicating via the network.

Although the applications device may be provided with a facility for communicating via the network, in some embodiments the system includes a network device, which provides a facility for communicating securely with the network using the key on the smart card. The network device therefore includes the smart card access device. The smart card provides a facility for securely receiving the content access data from a trusted server, via the network device, the content access data being encrypted using the first pre-stored key within the smart card. The content access data may be communicated to the network device identifying conditions for the reproduction of the content and/or providing, for example, a second content encryption key for decrypting the content.

Embodiments of the present invention also include an arrangement for providing a second encryption key, which is locally shared between the applications device and the network device. The second local encryption key (KCP) is generated by the applications device randomly and encrypted using a fourth program encryption key pre-stored in the trusted player (fourth program encryption key (KP)) within the applications device. The second local key is then communicated via the network to the trusted server. The trusted server and the network device can then securely communicate the second local key using the first encryption key stored in the smart card KC. Once the applications device and the network device have the second local encryption secret key, the content access data can be communicated between the smart card in the network device and the trusted player in the applications device. A cost efficient secure communications facility is thereby provided which allows the network device for communicating with the network to be separated from the applications device for reproducing the content. The network device and the applications device may therefore be optimised for implementing the functions of network communication and content reproduction respectively. For example, the applications device could be a Personal Digital Assistant (PDA) or a Personal Computer (PC) whereas the network device could be a mobile radio-telephone. Since the secure communication is implemented using private key encryption, security is provided at a relatively reduced cost compared with public key encryption which requires greater processing power and therefore expense.

In some embodiments the applications device authenticates the presence of the smart card and/or copied before determining whether the content may be reproduced. Authentication may include exchanging messages using the second local encryption key KCP, and determining the current status of the digital rights management data to determine whether reproduction of the content is allowed.

Various further aspects and features of the present invention made are defined in the appended claims.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF THE EXAMPLE EMBODIMENTS

EXAMPLE NETWORK

Figure 1:
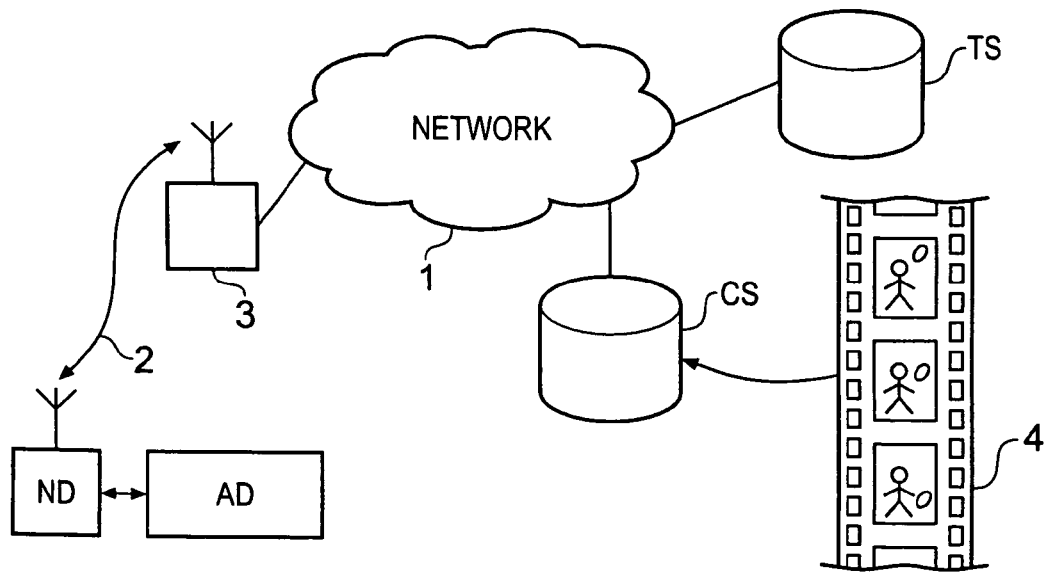
FIG. 1 is a schematic block diagram of a system for providing services to a user using an applications device in which sensitive data is distributed via a network device.

FIG. 1 provides an example arrangement in which data is distributed to an applications device via a network device. In FIG. 1 a network 1 includes a facility for communicating with a network device ND using for example a mobile communications link 2. The mobile communications link 2 is established between a node or base station 3 and the network device ND in accordance with an established interface standard. If the network includes a UMTS mobile radio network, then the communications interface may operate in accordance with the Universal Terrestrial Radio Access Network (UTRAN) standard. The network 1 provides a facility for communicating various types of data to equipment connected to the network. For example, a content server CS may be provided for distributing content 4 to an applications device AD. Also shown in FIG. 1 is a trusted server TS which, as will be explained shortly, provides a facility for communicating sensitive data to the network device ND for use by the applications device AD.

Embodiments of the present invention will now be described with reference to the arrangement shown in FIG. 1 where a network device ND is operatively associated with an applications device AD. The arrangement of the network device ND and the applications device AD provides a facility for communicating sensitive data for use with applications programs being executed on the applications device. In one example embodiment, the content 4 is reproduced by the applications device AD in accordance with access control data, which may form, in one embodiment, one example of sensitive data. The access control data may indicate conditions for the reproduction and copying of the content. The access control data may also provide a key for decrypting the content, if the content has been encrypted before being downloaded into the applications device AD. Although in FIG. 1 the content may be downloaded from a content server CS, the content may be received by the applications device AD via any convenient form such as via a data carrier (for example DVD, CD ROM) or any other convenient medium and from any source. The network device ND and the applications device AD are shown in more detail in FIG. 2.

Network and Applications Devices

Figure 2:
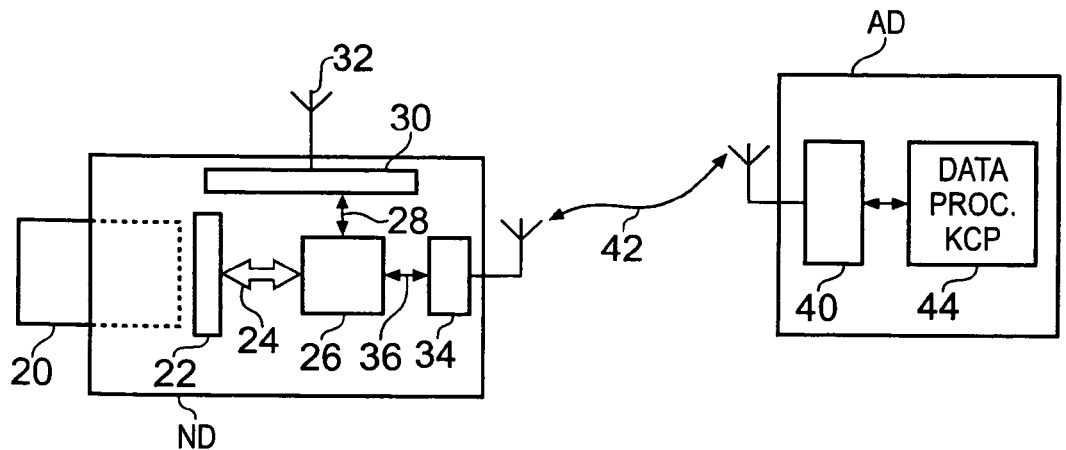
FIG. 2 is a schematic block diagram of an example network device and an example applications device, which appears in FIG. 1.

In FIG. 2 the network device ND is shown to include a smart card 20 which is loaded into a smart card access device 22 forming part of the network device. An access bus 24 connects the smart card access device to a data processor 26 for providing access to the smart card 20. The data processor is connected via a communications bus 28 to a communications interface 30 which is operable in accordance with a network communications standard to communicate with the network 1 as shown in FIG. 1. Thus the communications interface 30, for example, may operate in accordance with the Universal Terrestrial Radio Access Network (UTRAN) interface utilising antenna 32 to communicate via the communications link 2 as shown in FIG. 1. The communications interface 30 thereby provides a facility for connecting the network device ND with the network 1.

The network device ND also includes a second communications interface 34 connected via an internal bus 36 to the data processor 26, for forming a local communications link with an applications device AD. A corresponding communications interface 40 is included in the applications device AD for communicating data between the network device ND and the applications device AD. A communications link represented by a double headed arrow 42 is formed by the communications interface 34 in the network device ND and the communications interface 40 in the applications device AD. The communications link provides a facility for locally communicating between the applications device AD and the network device ND. In some embodiments the communications link may be formed by the operation of the communications interfaces 34, 40 using, for example, Bluetooth, RS232 or IEEE802.3 standards.

The applications device AD also includes a data processor 44 which is arranged to execute applications programs for providing services to a user.

Although the network device ND and the applications device AD are shown in FIGS. 1 and 2 as separate devices, in other embodiments the applications device and the network device may be formed physically as the same device. An example of such an embodiments is shown in FIG. 3.

Figure 3:
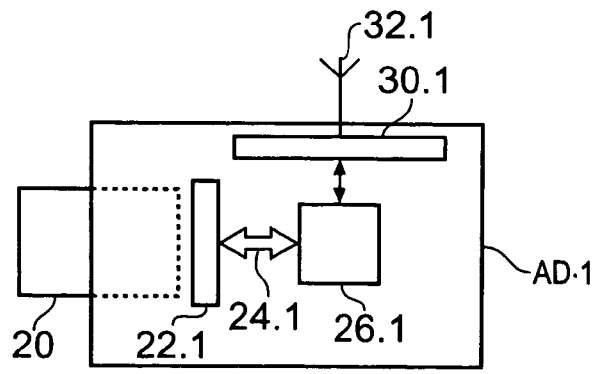
FIG. 3 is a schematic block diagram of another example applications device incorporating a network communications capability.

In FIG. 3 an applications device AD.1 is provided with a facility for communicating with the network 1, using a communications interface 30.1, which corresponds substantially to the communications interface of the network device ND shown in FIG. 2. For the applications device AD.1 shown in FIG. 3 the data processors 26, 44 on the applications device and the network device shown in FIG. 2, are replaced by the same data processor 26.1. The data processor 26.1 both executes applications programs and also controls communication with the network 1 and accesses the smart card 20. The applications device AD.1 could be a Personal Digital Assistant (PDA), a mobile telephone or similar device. The network device ND shown in FIG. 2 could also be implemented as a mobile telephone or a PDA, whereas the applications device AD could be a personal computer (PC).

More will be explained about the operation of the applications device and the network device in the following sections. However, for ease of explanation, the system illustrated in FIG. 1, which includes separate network, and applications devices will be adopted.

Smart Card

Figure 4:
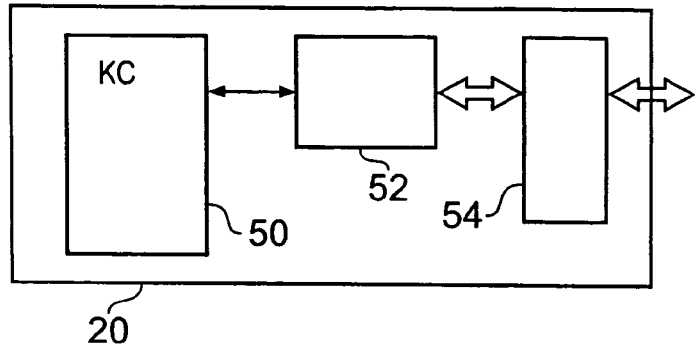
FIG. 4 is a schematic block diagram of a smart card.

FIG. 4 provides a simplified block diagram illustrating the form of a typical smart card. The smart card 20 is generally defined as having some data processing facility in combination with a memory and an interface. As shown in FIG. 4 the smart card 20 includes a memory 50, connected to a data processor 52 via an interface channel 54. The communications interface 54 is accessed via the smart card access device 22 (shown in FIG. 2) in order to read and to write data to/from the memory 50. However, one of the characteristics of smart cards is that the interface 54 does not have direct access to the memory 50. Thus only the processor 52 can access the memory 50 and then not everything is accessible via the interface 54. Typically a smart card may include data such as an encryption key KC which is pre-stored in a memory 50. The encryption key KC cannot be accessed from the interface 54 but can be used to encrypt data fed to the smart card which can then be encrypted by the data processor 52 using the pre-stored key KC. Therefore, generally the smart card can be characterised as having hardware limitations, which restrict access to the memory 50 thereby provided some security to data stored in the smart card. As will be explained shortly, the smart card provides a facility for storing sensitive data and decrypting and encrypting data to be communicated to and from the network and an applications program.

A Subscriber Identity Module (SIM) is an example of a smart card, another example being or a Universal Subscriber Identity Module (USIM) which are provided by network service providers and are uniquely associated with users of a telecommunications network such as GSM or UMTS. Thus when issued by a network service provider to a user, the smart card is uniquely associated with that user and includes the pre-stored encryption key KC for use with that smart card only.

Secure Communication Between the Network Device and the Applications Device

Figure 5:
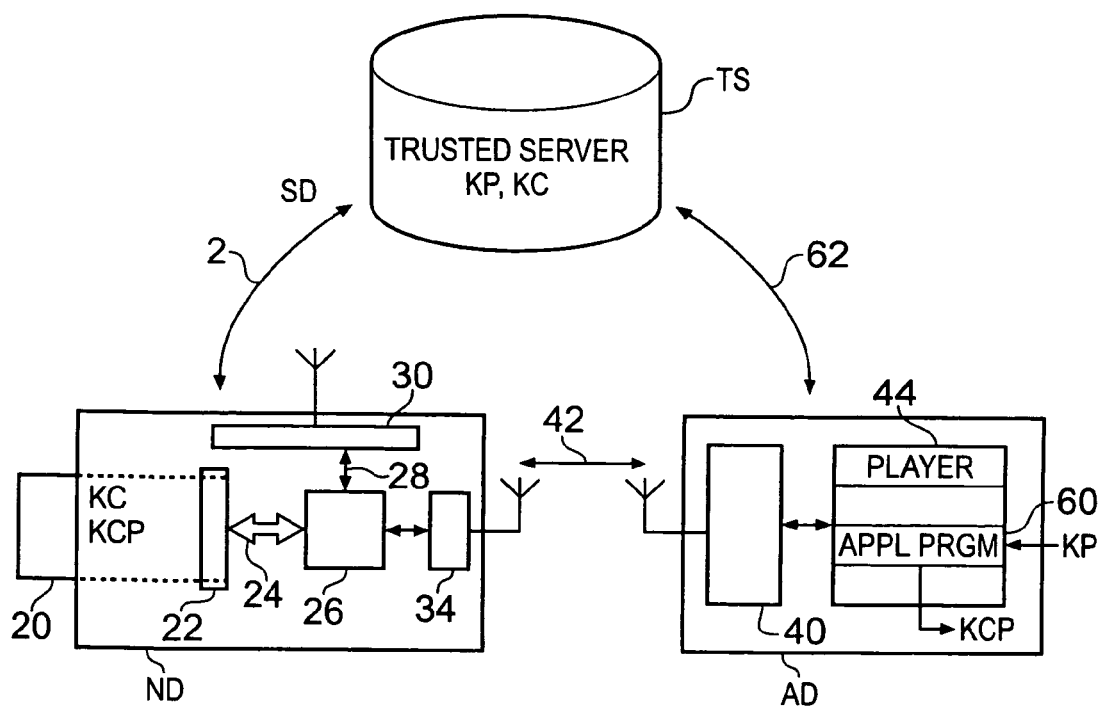
FIG. 5 is a block diagram of parts of the system shown in FIG. 1 for use in distributing sensitive data.

FIG. 5 provides an illustration of parts of the system of FIG. 1, which include the network device ND and the applications device AD and illustrates an arrangement for establishing secure communications between the smart card in the network device and the applications program in the applications device and for performing mutual authentication. FIG. 5 also shows the trusted server TS from FIG. 1 although the other network elements which appear in FIG. 1 are not represented in FIG. 5 for clarity.

Embodiments of the present invention provide a facility for distributing sensitive data to be used by an applications device AD by utilising security features inherent in smart cards which may be issued to users by network service providers for use with network devices. An advantage provided by embodiments of the present invention is that a facility for effecting secure communications between an applications device and a network device is achieved at a comparatively low cost, because private key encryption can be used rather than public key encryption which requires an increased processing capability.

FIG. 5 provides an illustration of an arrangement for effecting secure communication by securely generating a unique local key (KCP). The local key is generated in the applications device AD by an applications program to be communicated to the network device. A shared secret key KCP is thereby provided for communicating and authenticating actions by the applications device AD and the network device ND. Using the local shared key KCP, private key encryption can be utilised for communicating between the applications program and the smart card. Accordingly, the processing power of the smart card can be kept relatively low thereby maintaining reduced costs for the smart card with respect to that which would be required if public key encryption was used. The distribution of the private key and its generation will now be explained with reference to FIG. 4 in combination with a flow diagram shown in FIG. 5.

In FIG. 5 an applications program 60 being executed by the data processor 44 in the applications device AD includes a private key KP which is unique to that applications program but is also known by the trusted server TS. The applications program 60 is arranged to generate randomly a local shared key KCP to be shared for use between the applications device AD and the network device ND. The data processor 44 is arranged to encrypt the local key KCP with the program encryption key KP. The encrypted local key KP(KCP) is then communicated to the trusted server. The communication may be effected by any convenient means such as copying the encrypted local key KCP onto a storage medium and physically transporting the storage medium to the trusted server, or communication may be effected via the network device by communicating the encrypted key KCP via the local link 42 which may then be communicated via the network link 4 to the trusted server TS. However, as a generalisation communication between the applications device AD and the trusted server TS is represented by a double headed arrow 62.

The encrypted local key KC(KCP) is then received at the trusted server TS and decrypted using the private key KP. The trusted server can then communicate the local key KCP to the network device ND, by encrypting the local key KCP using the smart card key KC. Since the smart card has pre-stored the smart card key KC then communication of the local key KCP can be effected via the network communications link 2 to the communications interface 30. The local key KCP can then be decrypted in the smart card using the smart card key KC and stored in the smart card memory 50. Therefore, as a result the local key KCP is known to both the smart card in the network device ND and the applications program in the applications device AD and furthermore is unique to the pairing between the applications program and the smart card in the network device ND. As a result, whenever any communication is required between the network device ND and the applications device AD then encryption can be effected using the key KCP which can also be used to authenticate the smart card as well as the applications program 60 itself.

Figure 6:
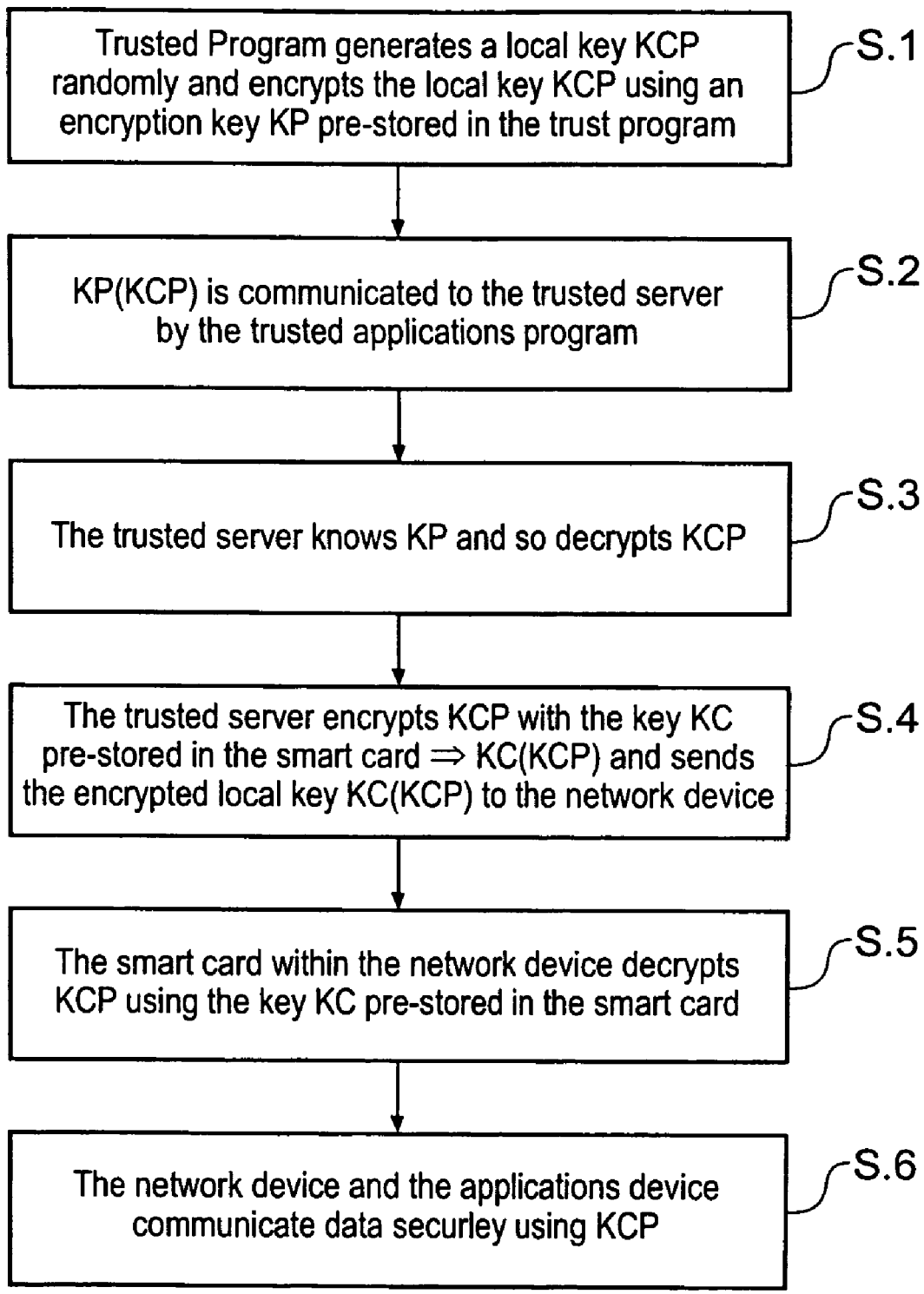
FIG. 6 is a flow diagram representing a process for establishing a shared local key between a smart card in the network device and an applications program running on the applications device shown in FIG. 1.

The process steps involved with generating the local key KCP shared between the applications device AD and the network device ND is illustrated in FIG. 6 and summarised as follows:

S1: The trusted program in the applications device AD generates a unique random key KCP and encrypts the random key using a program key KP which has been pre-stored in the trusted program.

S2: The encrypted local key KP(KCP) is communicated to the trusted server TS.

S3: The trusted server knows the encryption key KP used by the trusted applications program and so can decrypt the local key KCP.

S4: The trusted server encrypts the local key KCP with the smart card key KC which is stored in the smart card and uniquely associated with the user. The trusted server TS sends the encrypted local key KC(KCP) to the network device ND via the network communications link 2.

S5: The smart card decrypts the local key KCP using the pre-stored smart card key KC within the smart card 20 and stores the local key KCP within the smart card memory.

S6: The smart card and the applications program can then exchange data securely using the unique local key KCP.

Since the local key KCP has been randomly generated by the applications program 60, the key KCP is unique for the applications/network device pair. The local key KCP can also be used for authentication of both the smart card by the applications program and the applications program by the smart card. The applications program, which is an entity, which can be relatively easily copied, can be thereby uniquely operatively associated with a smart card, which is an entity, which cannot be easily copied.

Distribution and Update of Sensitive data

The parts of the system shown in FIG. 5 can provide a facility for communicating sensitive data securely between the applications program and the smart card in order to provide a service to a user. Examples of sensitive data might be, for example, a licence purchased for the reproduction of content, privacy information, private contact details or an electronic data representation of a monetary value. For the example of a monetary value, currency values may be provided in order to allow a user to purchase a product or service or conduct some electronic transaction whereby a monetary value is provided in exchange for the service or the product. Other examples of sensitive data are private information or policy information associated with, for example, contact details which are confidential to a user. These are examples of sensitive data, which may be changed by an applications program after some processing of the sensitive data.

Referring again to FIG. 5 the trusted server for example may store or generate the sensitive data which is to be utilised by the applications program running on the applications device AD. Since the smart card includes the unique smart card key KC associated with the user then the trusted server TS can encrypt the sensitive data SD and communicate the encrypted data KC(SD) to the smart card in the network device ND using the network communications link 2, as previously described. The encrypted sensitive data KC(SD) is received via the smart card using the smart card access device 22 and decrypted to recover the sensitive data which can then be stored on the smart card 20.

If the applications program on the applications device requires access to the sensitive data then a request for access can be communicated via the local link 42 which can be authenticated using the local key KCP which can be verified by the smart card 20 in network device. The sensitive data can then be encrypted using the local key KCP in the smart card 20 and communicated to the applications device AD where the applications program can decrypt the sensitive data using the local key KCP.

The applications program can also confirm the presence of the smart card providing the service to the user in accordance with the application program. Authentication and the presence of the smart card can be confirmed by exchanging messages using the shared local key KCP as already described.

If the applications program changes the sensitive data in some way then the sensitive data can be stored on the smart card 20 before being up-dated by the trusted server. However, in order to up-date the sensitive data on the trusted server TS the sensitive data must be communicated via the network link to the trusted server. For the example illustration shown in FIGS. 1 and 5, the network forms a mobile radio network and so the communications link 2 may not always be available. Therefore the network device ND may not always be in contact with the network 1. In a situation in which the network device cannot communicate with the network, the smart card acts as a local store for the sensitive data. Since the smart card itself includes security provisions (explained above), the sensitive data can be stored securely on the smart card, in a way, which uniquely associates that sensitive data with the user. Therefore, for example, if the sensitive data represents a monetary value, which changes as a result of a transaction, then the sensitive data can be up-dated to the smart card to reflect the change in value. The sensitive data is then up-datable via the network link 2 when the network link exists thereby providing a substantially coherent operation of the user service as determined by the applications program whether or not the network device is in communication with the network. This is because when the mobile network is not available, for example due to a lack of radio coverage, then the smart card acts as a local store for the up-dated monetary value.

Figure 7:
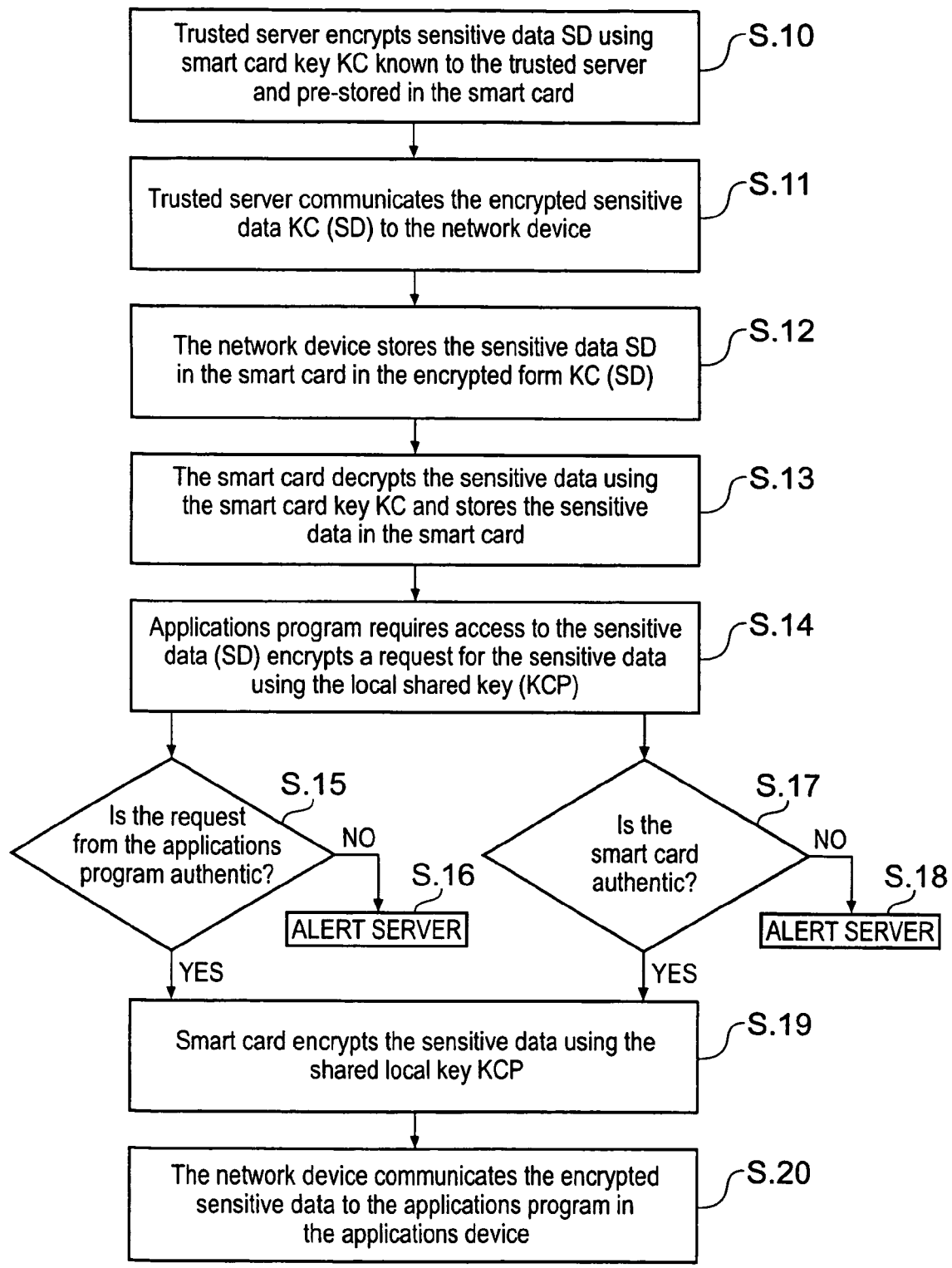
FIG. 7 is a flow diagram illustrating a process for distributing sensitive data to the applications program using the smart card of FIG. 6, including mutual authentication of the smart card and the applications program.
Figure 8:
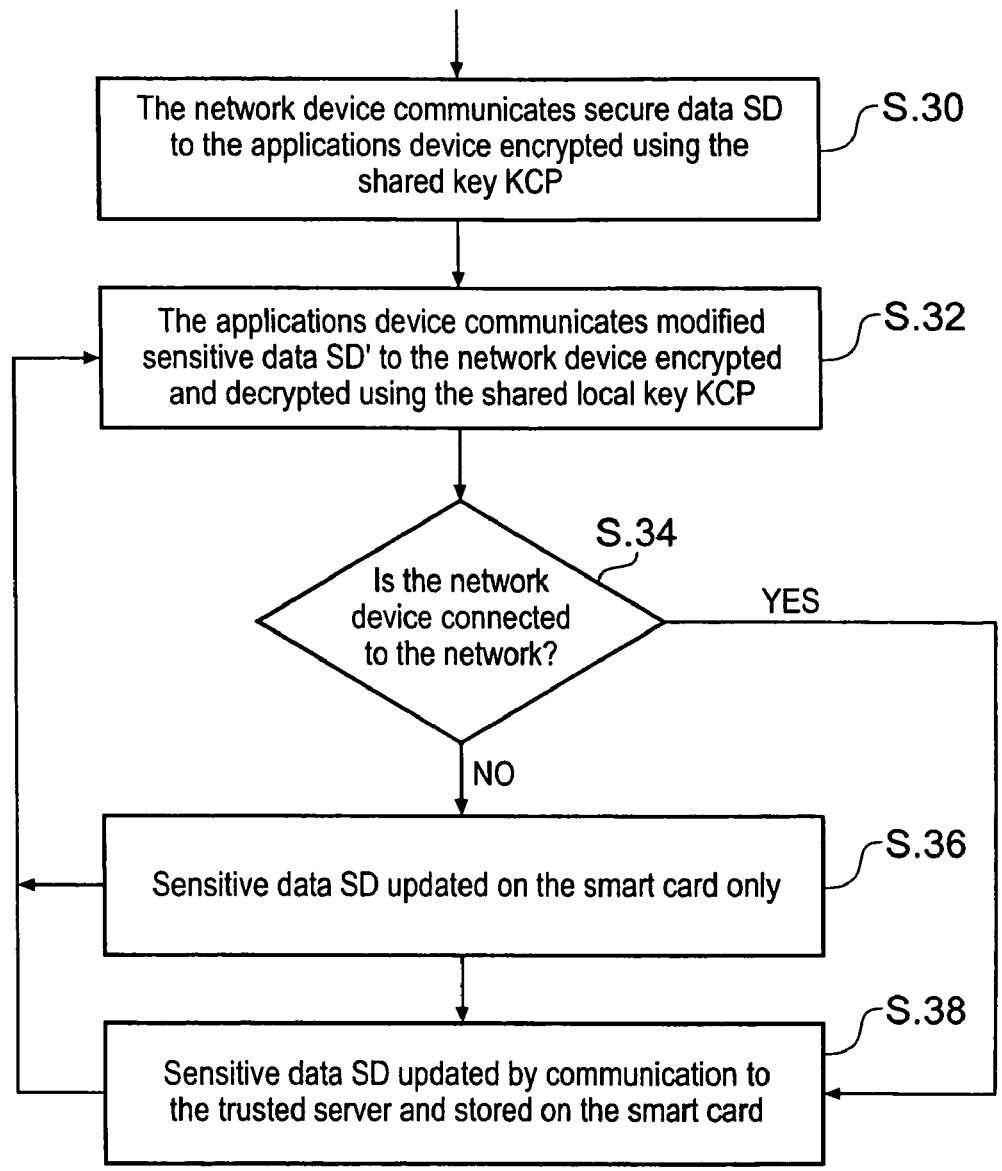
FIG. 8 is a flow diagram illustrating an operation of the smart card and the applications program of FIG. 6, when the smart card acts as a local server.

In summary, the operation of the embodiment of the invention illustrated in FIG. 5 is described by the flow diagrams shown in FIG. 7 and FIG. 8. The flow diagram in FIG. 7 illustrates the operation of the distribution of the sensitive data to the smart card, and access of the sensitive data on the smart card by the applications program. FIG. 8 illustrates the operation of the applications program on the applications device when using the smart card as a local server.

The flow diagram shown in FIG. 7 is summarised as follows:

S10: The trusted server encrypts the sensitive data SD using the smart card key KC. The trusted server knows the smart card key KC. The smart card key KC is also pre-stored in the smart card.

S11: The trusted server sends the encrypted sensitive data KC(SD) to the network device.

S12: The network device stores the encrypted sensitive data KC(SD) in the smart card where the data is decrypted using the smart card key KC.

S:13 The smart card then decrypts the sensitive data, using the smart card key KC, to recover the sensitive data. The decryption is performed on the smart card and the sensitive data is stored on the smart card.

S:14 When the applications program running on the applications device requires access to the sensitive data in order to provide a service to the user, the applications program encrypts a request for the sensitive data using the local shared key KCP, which has been established on the smart card.

S.15: Within the smart card, the smart card determines whether the request from the applications program is authentic. Authentication is performed by decrypting the request using the shared local key KCP. If a valid request is correctly recovered (according to a predetermined form) then the request is considered to be authentic. If the request is authentic then processing proceeds to step S.19. Otherwise processing proceeds to step S. 16.

S.16: If authentication fails, processing terminates and the trusted server is alerted to the fact that an illegal attempt has been made to access the sensitive data.

S.17: The applications program determines whether the smart card is authentic. This can be determined for example, by arranging for the smart card to respond to the request message sent to it, by generating a response message according to a predetermined format and encrypting the message using the shared local key KCP. If after decrypting the response, a response message having the correct format is recovered by the applications program then the smart card is determined to be authentic and processing proceeds to step S.19. Otherwise processing proceeds to step S.18.

S.18: If authentication fails, processing terminates and the trusted server is alerted to the fact that an attempt has been made to use an incorrect smart card.

S.19: If the smart card and the applications program have performed a mutual authentication successfully, which can be indicated by a further mutual message exchange, then the smart card encrypts the sensitive data using the shared local key.

S.20: The network device then sends the encrypted sensitive data to the applications program via the local communications interface.

One of the advantages provided by embodiments of the invention is that the smart card can act as a local server when the network is unavailable to the applications program. Any change to the sensitive data can be stored on the smart card and updated to the network, when the network is available. The operation of the applications program and the smart card when using the smart card as a local server as illustrated in FIG. 8 is summarised as follows:

S30: The smart card on the network device communicates the sensitive data to the applications program when this is required by the applications program running on the applications device. The network device encrypts the sensitive data using the local shared key KCP before being communicated via the local link 42.

S32: After the applications program has processed the sensitive data providing a service to the user and possibly changing the sensitive data, the sensitive data is communicated back to the network device by the applications device. The applications device again encrypts the sensitive data using the local key KCP, which is decrypted within the smart card 20 again using the shared local key KCP. The up-dated sensitive data can then be held on the smart card in a secure way and in unique association with the user. Thus, in this form the smart card acts as a repository for the sensitive data. It is only when the network device is in contact with the network that the sensitive data can be up-dated. Therefore, storing the sensitive data in up-dated form on the smart card maintains a coherent representation of the sensitive data, which can be secured on the smart card.

S34: If the network device is connectable to the network, then:

S36: The sensitive data SD is up-dated by communicating the currently stored sensitive data from the smart card to the trusted server. The sensitive data is encrypted using the smart card key KC within the smart card and correspondingly decrypted within the trusted server.

S38: If the network device is not connectable to the network then the sensitive data is maintained on the smart card only.

Distribution of Content and Rights Management Data

Another example embodiment of the present invention will now be described in association with providing a facility for distributing content to a user. As illustrated in FIG. 1 the content can be downloaded to an applications device from a content server where the content is stored. As mentioned above, the form by which the content can be distributed is not limited to being downloaded from a server but can be, for example, distributed on an appropriate medium such as a CD ROM or DVD or the like.

Figure 9:
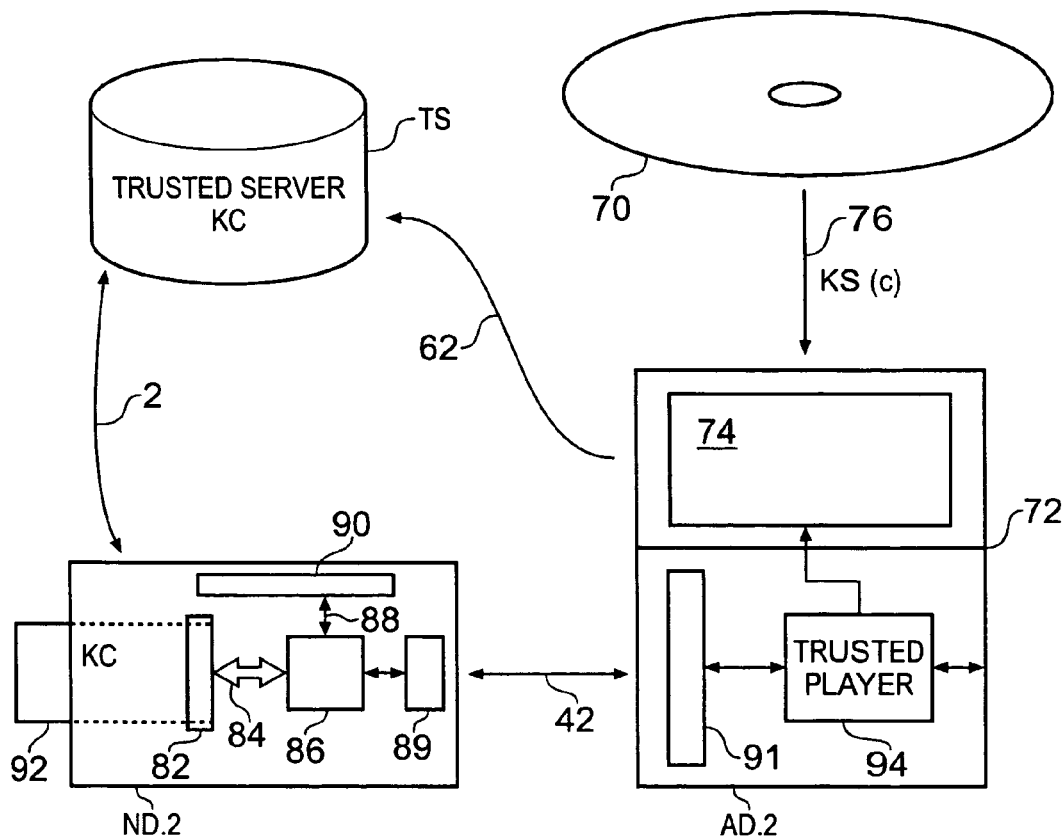
FIG. 9 is a schematic block diagram showing parts of a system which are arranged to distribute content to an applications device with content access data.

FIG. 9 provides an illustration of an embodiment of the present invention, which is arranged to distribute content securely and to manage the rights of that content. In FIG. 8 a CD ROM 70 is distributed to an applications device 72. The applications device 72 includes a visual display 74 for viewing the content, which in the present example application includes video material. Therefore, as illustrated by an arrow 76 the content is distributed from the CD ROM to the applications device for reproduction on the applications device. However, in order to control distribution and copying, the content is encrypted using an encryption key KS referred to in the following description as the content encryption key.

As already explained above, a local shared key KCP has already been set up between the applications device 72 and a network device 80. The network device and the applications device shown in FIG. 9 corresponds substantially to the network device and applications device shown in FIGS. 1, 2 and 4 and so only the differences between these alternative implementations will be explained.

According to an embodiment of the invention, if the user wishes to view the content received from the CD ROM 70 then a licence for the reproduction and/or permission to copy the content must be obtained either by purchase or in exchange for appropriate conditions. To this end, a trusted player 94, sends a request for the content key from the trusted server TS. The trusted player 94 represents an example of an applications program and so corresponds substantially to the applications program of the illustrated embodiment shown in FIG. 5. The request for the content key could be sent from the network device 80 which again could be encrypted using the smart card key KC. In response to the request to reproduce the content, the trusted server generates content access data, which is encrypted using the smart card key KC which is known to the trusted server. The encrypted content access data is then communicated via the network link 2 to the network device ND.2 and decrypted within the smart card 92 using the pre-stored smart card encryption key KC.

In order to reproduce the content, the trusted player 94 requires the content key KS. The content access data includes the content key KS which may be provided under conditions for reproducing and/or copying the content.

In response to a play command initiated by a user to request reproduction of the content by the trusted player, the trusted player retrieves the content access data from the smart card 92 by accessing the network device ND.2 via the communications link 42. The request is authenticated using the local key KCP so that in response to the request, the network device ND.2 reproduces the content access data after this has been encrypted within the smart card using the shared key KCP. The encrypted content access data can then be communicated to the trusted player 94 and decrypted to recover the content access data. As mentioned above, the content access data may include not only the content encryption key KS allowing the content to be decrypted but also the conditions for reproducing the content and/or copying the content in the form referred to generally as rights management data.

Once the content has been decrypted and reproduced, the content access data may be up-dated and sent back to the network device and stored in the smart card. Therefore, the smart card can be used as a repository for secure content access data which may be up-dated over the network to the trusted server when the network device is connected to the network, as explained with reference to the previous embodiment.

In accordance with the embodiment of the present invention illustrated in FIG. 9, a licence for the reproduction of particular content item can be purchased securely using the secure nature of the smart card. The applications device AD.2 confirms the presence of the smart card and authenticates the smart card before the content can be reproduced. As a result, an improved content distribution arrangement is provided which reduces the likelihood that the content may be illegally reproduced and/or copied in a way which is outside the control of the distributor.

Figure 10:
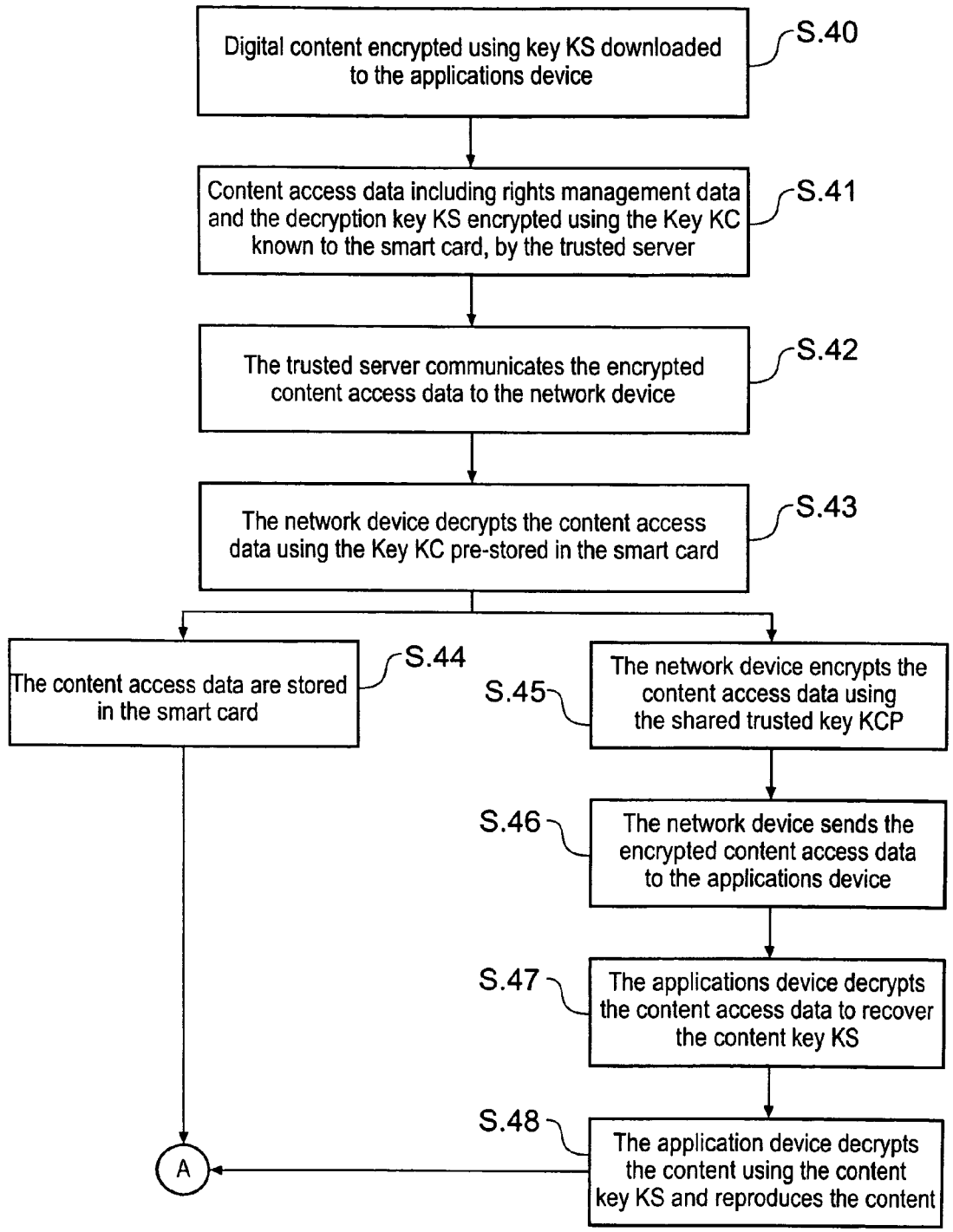
FIG. 10 is a flow diagram illustrating a process for delivering content access data to an applications device for use in accessing content.

The operation of the applications device and network device for reproducing encrypted content is provided in FIG. 10, which will be summarised as follows:

S40: Digital content, which has been encrypted, is loaded into the applications device. The content has been encrypted using a content encryption key KS.

S41: Content access data which includes rights management data providing reproduction rights and conditions for copying and includes the key KS are encrypted by the trusted server using the smart card encryption key KC. The content access data may include other types of data and information.

S42: The trusted server communicates the encrypted content access data the network device ND.2.

S43: The network device feeds the encrypted content access data to the smart card where it is decrypted using the smart card key KC.

S44: The content access data is stored in the smart card.

S45: The smart card encrypts the content access data which includes the rights management data and the decryption key KS using the local shared key KCP.

S46: The network device sends the encrypted content access data to the applications device.

S47: The trusted player in the applications device decrypts the content access data to recover the rights management data and the content key KS.

S48: The trusted player can then decrypt the content using the content key KS, which is reproduced by the reproduction display 74.

Figure 11:
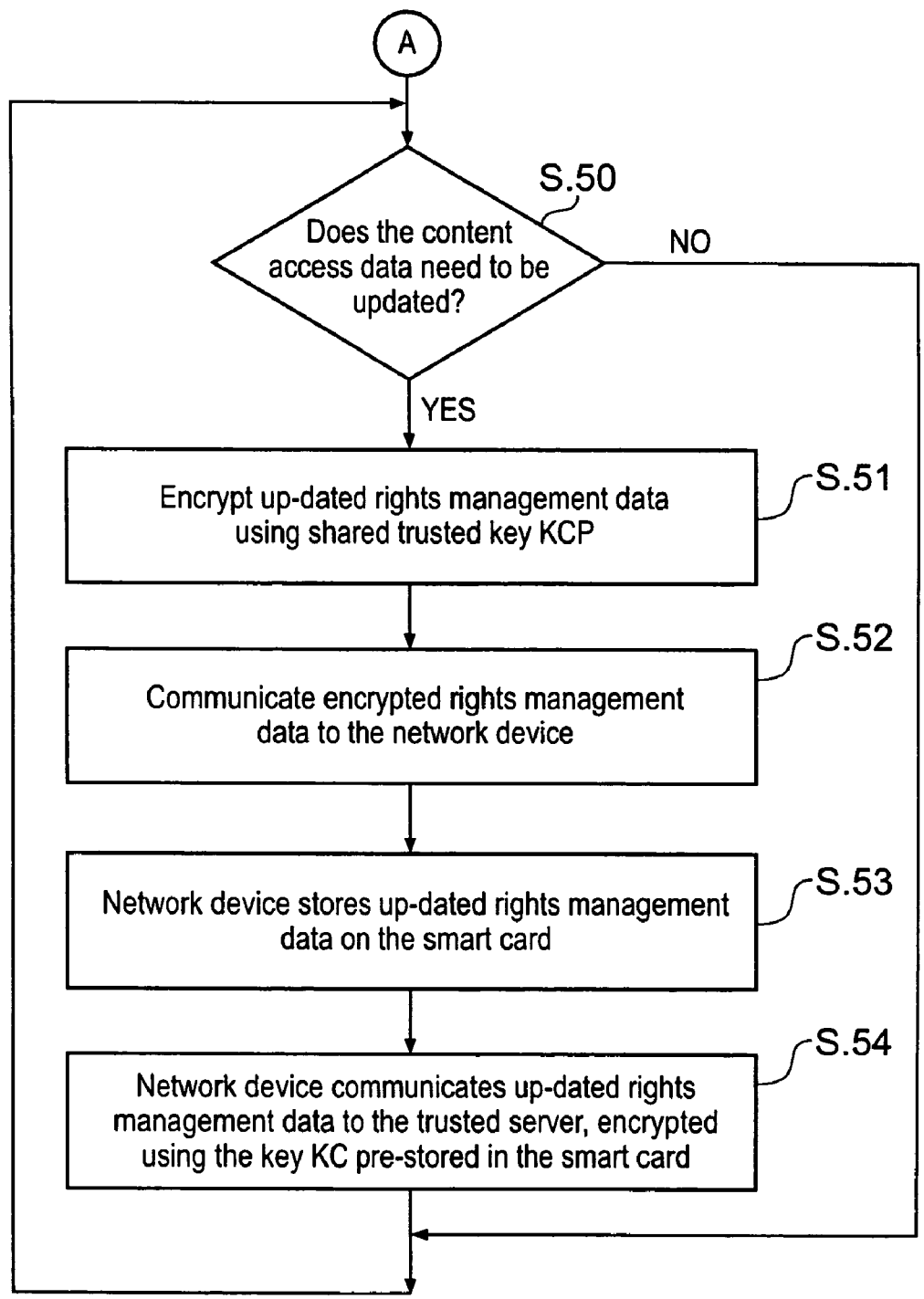
FIG. 11 is a flow diagram illustrating a process for securely storing up-dated content access data on a smart card shown in FIG. 9.

After the content has been reproduced by the applications device the rights management data may be required to be up-dated to reflect the fact that the data has been reproduced. Accordingly, the operation of the applications device and network device is summarised in FIG. 11 which continues from a node "A" which appears in FIG. 10:

S50: After reproducing the content the trusted player determines whether the digital rights data needs to be up-dated.

S51: If the rights management data does need to be up-dated then using the local key KCP the up-dated rights management data is encrypted.

S52: The encrypted rights management data is communicated to the smart card in the network device ND.2.

S53: The smart card device decrypts the rights management data and stores the rights management data on the smart card.

S54: The network device then communicates the up-dated rights management data to the trusted server securely by encrypting the up-dated rights data with the smart card key KC.

In summary, the distribution of the content and the management of the rights in that content is made by the trusted server in combination with the smart card which is uniquely associated with a user. Using the security features inherent in the smart card the content access data can be securely communicated to the user on the smart card. Furthermore, by arranging for a local key (KCP) to be generated and shared between the trusted player (applications program) in the applications device and the smart card in the network device then the content access data can be communicated to the trusted player and then up-dated to the network device for secure storage on the smart card.

Enhanced Reproduction Security

Figure 12:
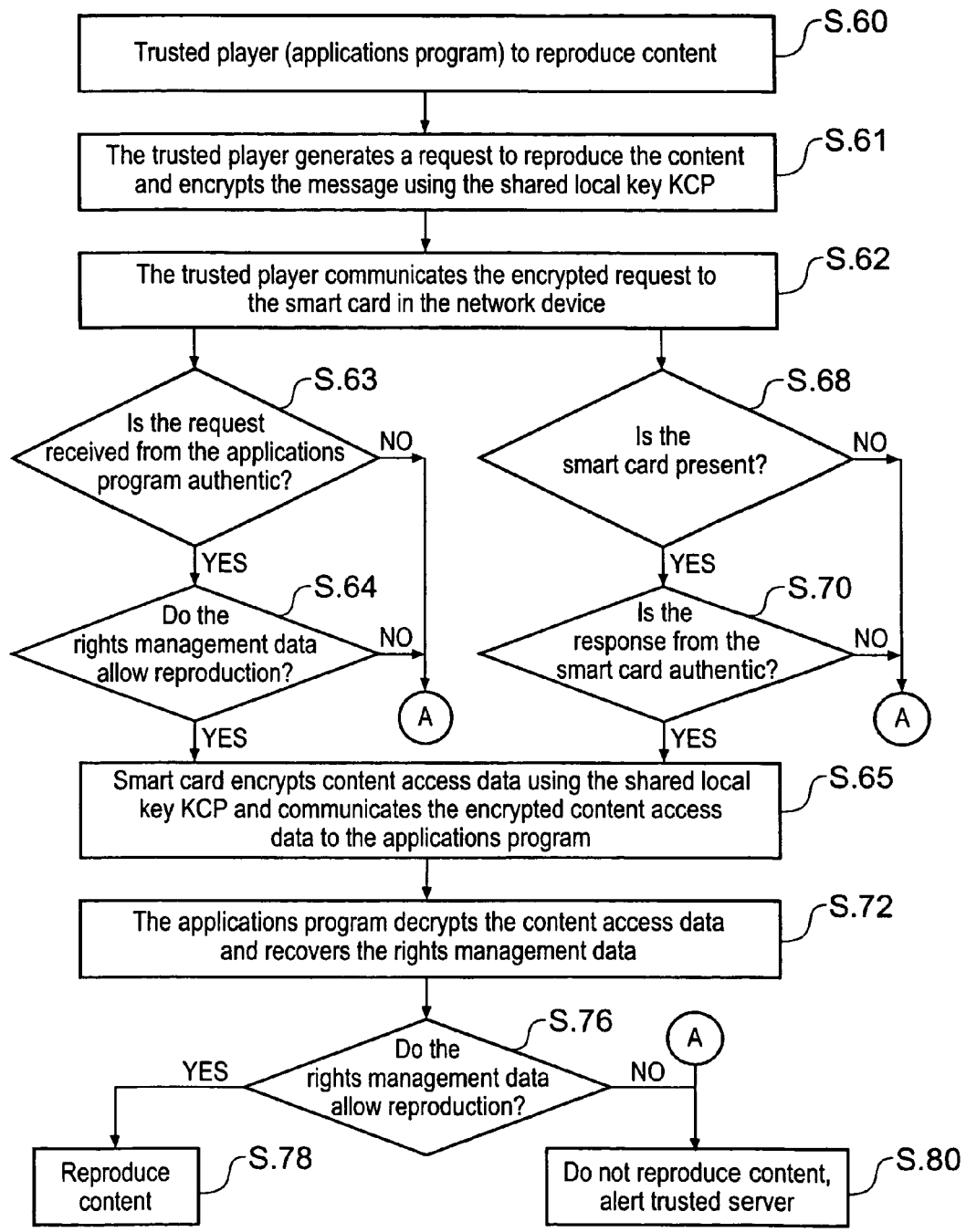
FIG. 12 is a flow diagram illustrating a process in which mutual authentication between a smart card and a trusted player is performed and rights management data is checked before content is reproduced.

In order to enhance the security of the reproduction of the content and the management and execution of the rights in the content enhanced security provisions are provided. The enhanced security provisions are provided by arranging for the trusted player in the applications device to identify whether the smart card is present within the network device before the content is decrypted and reproduced. In addition, the trusted player may also authenticate the smart card before either reproducing the content or, copying the content, or indeed performing any other action. A flow diagram representing a process for reproducing the content as executed by the applications device shown in FIG. 9 is illustrated in FIG. 12 and summarised as follows:

S60: The user activates a reproduction mode with the effect that the trusted player (applications program) is arranged to reproduce the content, which has been loaded into the applications device.

S61: The trusted player (applications program) then generates a request message, indicating that the trusted player wishes to reproduce the content. The trusted player encrypts the request message using the shared local key KCP.

S.62: The trusted player then communicates the encrypted request to the smart card in the network device.

S.63: The smart card then determines whether the request received from the applications program is authentic. Authenticity can be determined by decrypting the encrypted request message using the shared local key KCP. If a message according to a correct format is recovered (according to a pre-arranged standard) then the message is authenticated. If the request is authentic then processing passes to step S.64, otherwise processing passes via node A to step S.80.

S.64: The smart card then examines the rights management data forming part of the content access data to determine whether the applications program has the right to reproduce or copy the content. If the applications program does have the right to reproduce the content then processing passes to step S.66, otherwise processing passes via node A to step S.80.

S.68: In parallel as part of a mutual authentication, the applications program determines whether the smart card is present in the network device. If the smart card is present then processing passes to step S.70, otherwise processing passes via node A to step S.80.

S.70: The applications program then determines whether the smart if present is the correct smart card. This can be determined in several ways. For example the smart card may send a message in response to the request message to reproduce the content message. For some embodiments, the response message may be the content access data encrypted as explained in step S.66.

The response message from the smart card is encrypted using the shared local key KCP. If upon decrypting the response received from the smart card using the shared local key KCP a correct response message is recovered, then the smart card is determined as authentic. If the applications program determines that the smart card is authentic, then processing proceeds to step S.66, otherwise processing passes via node A to step S.80.

S.66: The smart card then encrypts the content access data using the shared local key KCP and communicates the encrypted content access data to the applications program.

S.72: The applications program decrypts the content access data and recovers the rights management data.

S.76: The applications program then determines whether the rights management data allows reproduction and/or copying which ever has been requested. If the rights management data does allow reproduction then processing passes to step S.78 and the content is reproduced, otherwise processing passes to step S.80.

S.78: The content is reproduced and/or copied in accordance with the request.

S.80: At step S.80 the content is not reproduced and the trusted server is alerted to the attempt to reproduce the content in a way which may be contrary to the wishes of the distributor.

In some embodiments the applications device may request the sensitive data from the trusted server in accordance with the operation of the applications program. In order to authenticate the request for the sensitive data, the applications program may include the program key KP, which is known to the trusted server. Furthermore if the request is communicated to the trusted server via the network device, then a subscriber line identity number which is pre-stored in the smart card (SIM) may be communicated with the request in order to verify that the request for the sensitive data is authentic.

Various further aspects and features of the present invention are defined in the appended claims.

Various modifications may be made to the embodiments herein before described without departing from the scope of the present invention. For example, although the described embodiments envisage a separate applications device to the separate network device connected via a local communications link, it will be appreciated that in other embodiments the network and applications devices may be combined into a single device. For such an embodiment there will be no requirement for a local communications link or alternatively the local communications link would represent a hardware wire communications channel between different devices. Correspondingly the applications program and the data processor of the network device may be the same data processor executing software. In this case the communication link between the applications device and the network device would be an internal link within the structure of an applications program.

The invention claimed is:

1. A system for distributing content access data to a user, the content access data providing rights management data indicating a right of the user to at least one of reproduce and copy distributed content, the system comprising:
    an applications device including an applications program forming a trusted player for at least one of receiving, reproducing and copying the distributed content;
    a smart card access device operable to access a smart card which is uniquely associated with the user;
    a trusted server operable to communicate securely the content access data to the smart card via a communications network by encrypting the content access data using a first encryption key pre-stored on the smart card and known to the trusted server, the smart card being operable to decrypt the encrypted content, access data using the first encryption key and to store the decrypted content access data on the smart card;
    wherein the trusted player is operable to request from the smart card the content access data independently of the distributed content, to receive from the smart card the content access data encrypted with a second local encryption key shared between the smart card and the trusted player, to access the rights management data provided with the content access data on the smart card, and to at least one of reproduce and copy the distributed content in accordance with the rights management data.

2. The system as claimed in claim 1, wherein the distributed content is encrypted using a third content encryption key, the content access data including the third content encryption key, the trusted player being operable to recover the third content encryption key from the content access data accessed from the smart card, and to decrypt the distributed content using the third content encryption key provided with the content access data in accordance with whether at least one of the reproduction and the copying of the distributed content is permitted by the rights management data.

3. The system as claimed in claim 1, wherein the rights management data includes an indication of a number of times the distributed content can be reproduced, the trusted player being operable to update the rights management data in accordance with the reproduction of the distributed content and to store the updated rights management data on the smart card.

4. The system as claimed in claim 1, wherein the trusted player is allowed access to the content access data on the smart card only following a mutual authentication between the smart card and the trusted player.

5. The system as claimed in claim 4, wherein the mutual authentication includes an exchange of messages between the trusted player and the smart card, the messages being encrypted using a the second local encryption key shared between the smart card and the trusted player.

6. The system as claimed in claim 1, wherein the trusted player is operable to generate the second local encryption key, encrypt the second local encryption key using a fourth program encryption key forming part of the trusted player, and to communicate the encrypted second local encryption key to the trusted server, and the trusted server is operable to encrypt the second local encryption key with the first encryption key, and to communicate the encrypted second local encryption key to the smart card via the communications network, the smart card being operable to decrypt the second local encryption key using the first encryption key.

7. The system as claimed in claim 1, further comprising:
    a network device for communicating via the communications network, the network device including the smart card access device which is operable to access the smart card;
    a communications interface for communicating data securely via the communications network using the first encryption key; and
    a local communication interface for communicating data with the applications device, the applications device including a corresponding local interface for communicating with the network device, the smart card on the network device and the trusted player on the applications device being operable to effect secure communication of the content access data via the local communication interfaces using the second local encryption key shared between the applications device and the network device.

8. The system as claimed in claim 1, wherein the communications network includes a mobile radio network, the communications interface in the network device including a mobile radio communications device for communicating via the mobile radio network.

9. The system as claimed in claim 8, wherein the smart card is a subscriber identity module for the mobile radio network, providing the pre-stored first encryption key and a subscriber line identity number.

10. The system as claimed in claim 9, wherein the applications device is operable to request the content access data from the trusted server, the request including the subscriber line identity number from the smart card encrypted with a fourth program encryption key, the trusted server being operable to communicate the secure data to the smart card if both the fourth program encryption key and the subscriber line identity number are authenticated.

11. The system as claimed in claim 1, wherein the trusted player is operable to confirm presence of the smart card in the smart card access device before reproducing the content.

12. The system as claimed in claim 1, wherein the trusted player is operable to confirm presence of the smart card by exchanging messages encrypted using the second local encryption key with the smart card.

13. A method for distributing content access data to a user, the content access data providing rights management data indicating a right of the user to at least one of reproduce and copy distributed content, the method comprising:
receiving the distributed content in an applications program which forms a trusted player for at least one of receiving, reproducing and copying the distributed content;
accessing a smart card which is uniquely associated with the user;
encrypting the content access data using a first encryption key pre-stored on the smart card and known to a trusted server;
communicating securely the encrypted content access data from the trusted server to the smart card via a communications network;
decrypting the encrypted content access data using the first encryption key, and storing the decrypted content access data on the smart card;
requesting, independently of the distributed content, the content access data from the smart card;
receiving, from the smart card, the content access data encrypted with a second local encryption key shared between the smart card and the trusted player;
accessing the rights management data provided with the decrypted content access data using the trusted player; and
using the trusted player in accordance with the rights management data to at least one of reproduce and copy the distributed content.

14. The method as claimed in claim 13, wherein the distributed content is encrypted using a third content encryption key, the content access data including the third content encryption key, the method further comprising:
recovering the third content encryption key from the content access data accessed from the smart card; and
decrypting the distributed content using the third content encryption key provided with the content access data in accordance with whether at least one of the reproduction and the copying of the distributed content is permitted by the rights management data.

15. The method as claimed in claim 13, further comprising:
updating the rights management data in accordance with a reproduction of the distributed content; and
storing the updated rights management data on the smart card;
wherein the rights management data includes an indication of a number of times the distributed content can be reproduced.

16. The method as claimed in claim 13, wherein accessing the rights management data provided with the content access data includes mutually authenticating the smart card and the trusted player, and allowing access to the content access data on the smart card only if the mutual authentication between the smart card and the trusted player is successful.

17. The method as claimed in claim 16, wherein mutually authenticating the smart card and the trusted player includes encrypting messages using the second local encryption key shared between the smart card and the trusted player, exchanging the messages between the trusted player and the smart card, and decrypting the messages using the second local encryption key, the smart card and the trusted player being mutually authenticated if the messages are correctly recovered.

18. The method as claimed in claim 13, further comprising generating the second local encryption key;
encrypting the second local encryption key using a fourth program encryption key forming part of the trusted player;
communicating the encrypted second local encryption key to the trusted server;
encrypting the second local encryption key with the first encryption key known to the trusted server;
communicating the encrypted second local encryption key to the smart card via the communications network; and
decrypting the second local encryption key using the first encryption key in the smart card.

19. The method as claimed in claim 13 wherein the smart card is a subscriber identity module which provides the pre-stored first encryption key and includes a subscriber line identity number.

20. The method as claimed in claim 13, further comprising:
communicating a request for secure data from the trusted server, the request including the subscriber line identity number from the smart card encrypted with a fourth program encryption key;
authenticating the subscriber line identity number and the fourth program encryption key;
communicating the secure data to the smart card if both the fourth program encryption key and the subscriber line identity number are authentic.

21. The method as claimed in claim 13, further comprising:
confirming presence of the smart card before reproducing the distributed content by exchanging the second local encryption key with the smart card.

22. An applications device executing an applications program forming a trusted player for at least one of receiving, reproducing and copying distributed content in accordance with content access data, the content access data providing rights management data indicating a right of the user to at least one of reproduce and copy the distributed content, the applications device comprising:
a smart card access device operable to access a smart card which is uniquely associated with the user, the smart card being operable to receive the content access data from a trusted server via a communications network, the content access data being encrypted using a first encryption key pre-stored on a smart card, the smart card being operable to decrypt the content access data using the first encryption key and to store the decrypted content access data on the smart card;

wherein the trusted player is operable to request from the smart card content access data independently of the distributed content, to receive from the smart card the content access data encrypted with a second local encryption key shared between the smart card and the trusted player, to access the rights management data provided with the content access data received on the smart card, and to at least one of reproduce and copy the distributed content in accordance with the rights management data.

23. The applications device as claimed in claim 22, wherein the trusted player is allowed access to the content access data on the smart card only following a mutual authentication between the smart card and the trusted player.

24. Apparatus for distributing content access data to a user, the content access data providing rights management data indicating a right of the user to at least one of reproduce and copy distributed content, the apparatus comprising:

means for receiving the distributed content in an applications program which forms a trusted player for at least one of receiving, reproducing and copying the distributed content;

means for accessing a smart card which is uniquely associated with the user;

means for encrypting the content access data using a first encryption key pre-stored on the smart card and known to a trusted server;

means for communicating securely the encrypted content access data from the trusted server to the smart card via a communications network;

means for decrypting the encrypted content access data using the first encryption key, and storing the decrypted content access data on the smart card;

means for requesting, independently of the distributed content, the content access data from the smart card;

means for receiving, from the smart card, the content access data encrypted with a second local encryption key shared between the smart card and the trusted player;

means for accessing the rights management data provided with the dcrypted content access data using the trusted player; and means for at least one of reproducing and copying the distributed content using the trusted player in accordance with the rights management data.

25. The apparatus as claimed in claim 24, wherein the distributed content is encrypted using a third content encryption key, the content access data including the third content encryption key, the apparatus further comprising:

means for recovering the third content encryption key from the content access data accessed from the smart card; and means for decrypting the distributed content using the third content encryption key provided with the content access data in accordance with whether at least one of the reproduction and the copying of the distributed content is permitted by the rights management data.

26. The apparatus as claimed in claim 24, further comprising:

means for updating the rights management data in accordance with a reproduction of the distributed content; and means for storing the updated rights management data on the smart card;

wherein the rights management data includes an indication of a number of times the distributed content can be reproduced.

* * * * *